Jan. 21, 1958   H. L. KOEGEL   2,820,624
WEIGHING BOTTOM BLOCK
Filed Sept. 26, 1955
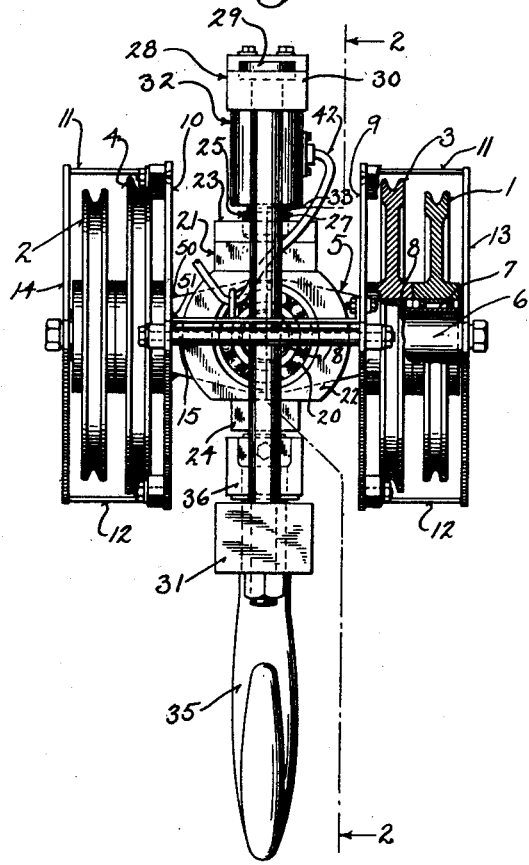
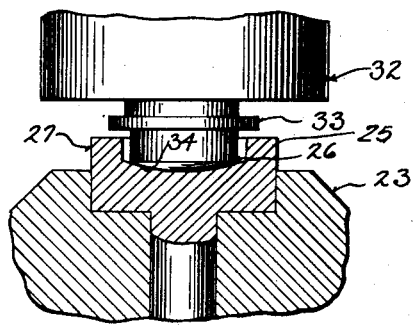
INVENTOR
HERMAN L. KOEGEL
BY
Wheeler, Wheeler + Wheeler
ATTORNEYS Jan. 21, 1958   H. L. KOEGEL   2,820,624
WEIGHING BOTTOM BLOCK
Filed Sept. 26, 1955   5 Sheets-Sheet 2

INVENTOR
HERMAN L. KOEGEL
BY
Wheeler, Wheeler & Wheeler
ATTORNEYS

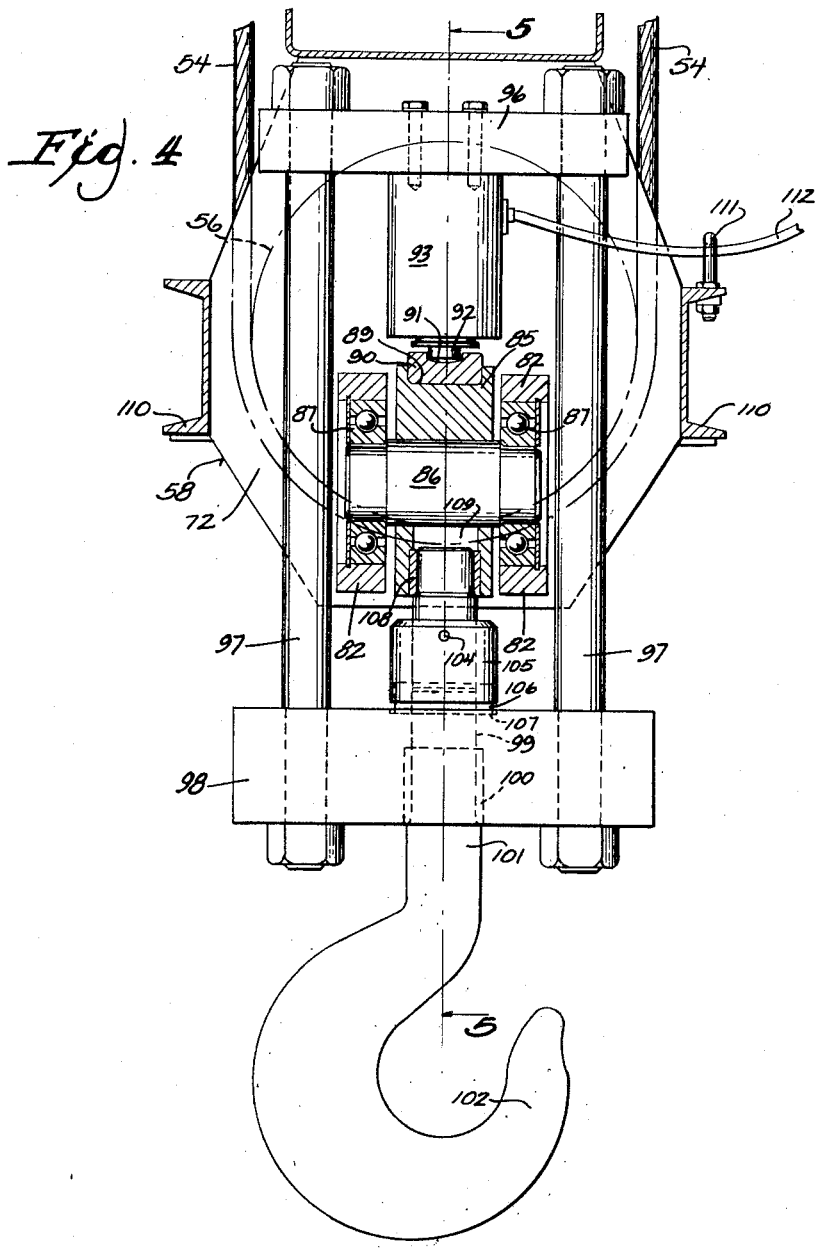

Jan. 21, 1958     H. L. KOEGEL     2,820,624
WEIGHING BOTTOM BLOCK

Filed Sept. 26, 1955     5 Sheets-Sheet 5

INVENTOR.
HERMAN L. KOEGEL
BY
Wheeler, Wheeler & Wheeler
ATTORNEYS

United States Patent Office 2,820,624
Patented Jan. 21, 1958

2,820,624

WEIGHING BOTTOM BLOCK

Herman L. Koegel, Greendale, Wis., assignor to Harnischfeger Corporation, Milwaukee, Wis., a corporation of Wisconsin Application September 26, 1955, Serial No. 536,526

15 Claims. (Cl. 265—27)

This invention relates to weighing load blocks for cranes, etc. This application is a continuation in part of my copending application Serial No. 387,245, filed October 20, 1953, now abandoned.

Crane lifting blocks are usually constructed to utilize the vertical height available to maximum advantage; that is to say so as to carry the lifting hook as high in relation to the sheave nest as possible. In this way wasting of the headroom of the crane, which is always limited, is avoided. Heretofore, when crane blocks have been utilized in connection with a weighing operation it has been customary to suspend a weighing device, usually a beam scale, from the hook of the load block and in turn to suspend the load from a secondary hook forming a part of the weighing device. This arrangement requires headroom equal in height to the load block and its hook, the height of the weighing device including the shackle by which it is lifted and the height of the secondary hook furnished with the weighing device. The very considerable loss of headroom thus entailed has usually caused crane suspended weighing equipment to be regarded as a temporary adjunct not suitable for use in connection with the usual load handling routine.

Some have attempted heretofore to combine weighing equipment with the usual load block but the apparatuses used have not been found fully suitable because of inaccuracies in weighing caused by a lack of precise vertical alignment of the load with the sensitive element of the weighing apparatus. Such misalignment has been due to a large extent to the inevitable friction occurring in a sheave nest and the consequent variation in the tension in the several passes of the hoisting line which causes a canting of the block.

It is an object of this invention to provide a weighing load block in which the sensitive element is combined with the load block assembly at a point between the sheave nest thereof and the hook thereof to avoid the loss of headroom occasioned by a secondary hook.

It is another object of this invention to provide a weighing load block in which an element sensitive to the load forces is attached to the lifting hook thereof at one end and engages a self-aligning intermediate member supported by the sheave nest.

Another object of this invention is to provide a weighing load block in which a hook supporting yoke extends around and to a point above the axis of a sheave nest to apply load force to the upper end of a compressively-loaded electrical-resistance strain gauge, which in turn applies the load force downwardly upon an adjustable anvil pivotally mounted on cross trunnions secured to the axle of the sheave nest.

Another object of this invention is to provide adjustable engagement means between a downwardly acting strain gauge element and the axle of a sheave nest in a weighing load block wherein a spherical loading member secured to the strain gauge acts not only to apply the force of the load but to exert a positive leveling force upon the anvil to minimize eccentric loading of the strain gauge.

In preferred embodiments of the invention the sheave axle has a drop center frame so that the axis on which the anvil trunnions oscillate is below the axis on which the cable sheaves turn. Accordingly, if the sheave axle tilts so that the sheaves at opposite sides of the anvil are at different levels, the moment arm provided by the offset between the sheave axle and trunnion axis is effective to restore the sheave axle to level position under the pull of the hook load.

In another embodiment of the invention, I provide multiple strain gauge cells, the load being divided amongst the several strain gauge cells. In this manner the respective strain gauge cells and bearing anvils may be made smaller than if but a single cell and anvil are relied on to bear the entire load. Hence, headroom may be still further conserved in these embodiments of the invention.

This invention is herein described by reference to the accompanying drawings forming a part hereof in which there is set forth by way of illustration and not of limitation several forms in which the weighing load block of this invention may be embodied.

In the drawings:

Fig. 1 is a front view in elevation with parts broken away and in section of one form of the weighing load block of this invention.

Fig. 3 is a detailed end view partly in section showing the engagement between the spherical thrust member of the strain gauge and the adjustable anvil of the weighing load block shown in Figs. 1 and 2.

Fig. 4 is a view partly in elevation and partly in section showing a modified embodiment of the invention in which the hoist block is provided with a drop center frame on which the strain gauge cell is journaled.

Figure 2:
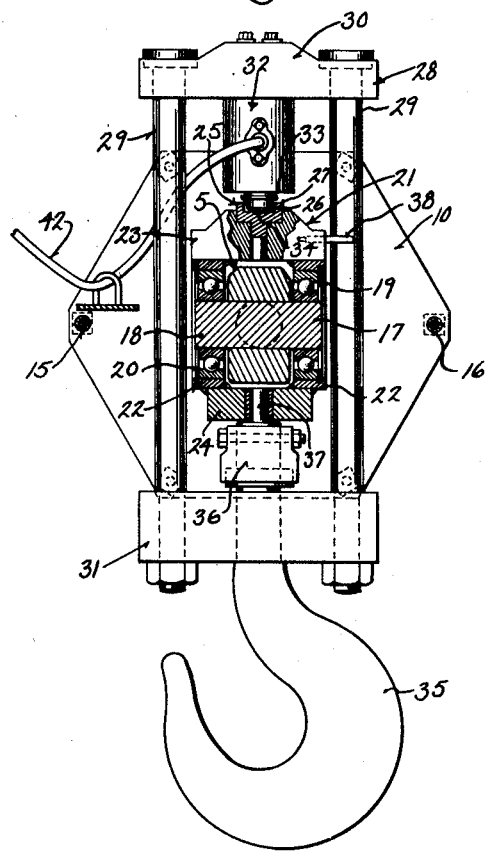
Fig. 2 is an end view in elevation and in section viewed through the broken plane 2—2 indicated in Fig. 1.

In the form of the weighing load block of this invention illustrated in Figs. 1–3 of the drawings, the parts which are engaged by the hoisting line, not shown, are made up of a nest of sheaves consisting of outer sheaves 1 and 2 and inner sheaves 3 and 4. The sheaves 1 to 4 are carried on the ends of a cross axle 5 formed with a deep rectangular cross section at the center, turned down at the ends to form spindles 6, one of which appears in Fig. 1. The spindles 6 support bearings such as are indicated at 7 and 8 at the hubs of the sheaves, said bearings being preferably of the roller or other anti-friction type to minimize friction, particularly static friction. Secured by welding 50 to shoulder portions 51 of the cross axle 5 adjacent the turned down spindle are inner guard plates 9, 10, also interconnected by cross connecting bolts 15 and 16. Outer guard plates 13 and 14 are connected to their respective inner guard plates by connecting cross rod members 11—11 and 12—12 as shown.

Inserted in and extending laterally through the central part of the cross axle 5 is a horizontal trunnion having end spindles 17 and 18 which serve to support anti-friction bearings 19 and 20 carried in trunnion bearing seats provided therefor in the side cheeks 22—22 of an anvil frame or intermediate member 21 which straddles the cross axle 5. The anvil frame 21 is made up of the side cheeks 22—22, above noted, joined at the top by an anvil seat 23 welded thereto and joined below by a cross member 24 likewise welded to the cheeks as shown more clearly in Fig. 2.

Mounted within a vertical counterbore, centrally located in the anvil seat 23, is an anvil proper 25, having a spherically concave anvil face 26 surrounded by a collar 27.

The anvil frame 21, by reason of the freedom of motion afforded by trunnion bearings 19 and 20 and the bearings 7 and 8 within the sheave nest, may accommodate with a tilting motion so as to approach vertical alignment from any direction within limits determined by stop members to be described.

Surrounding the cross axle 5 and the associated anvil frame 21 is a yoke 28 made up of spaced vertical tension rods 29—29 joined above and below by upper cross beam 30 and lower cross beam 31. Centrally mounted beneath the cross beam 30 and between the tension rods 29—29 and facing downwardly is a compressively-responsive load-sensitive strain gauge 32. The lower active thrust abutment of the strain gauge 32 is formed, as shown, as a cylindrical collar 33 having a lower thrust receiving face 34 which has the configuration of a spherically convex segment herein called a spherical face. The spherical face 34 is in thrust communicating contact with the anvil face 26.

Extending through and downwardly from the central area of lower cross beam 31 is a lifting hook 35 having a shank which engages a thrust bearing 36 retaining the hook 35 but permitting it to be turned in any direction desired. The upper end of the shank of hook 35 is provided with a concentric upwardly projecting spindle 37 closely received freely to rotate within the hole in a bushing contained in the lower cross member 24 of the anvil frame 21. By reason of this arrangement, frame 21 is guided in unison with yoke 28 so far as vertical alignment is concerned.

In order to retain the yoke 28 in substantially transverse relationship to the axle 5, stop pins 38—38 secured to the anvil frame 21 and projecting laterally therefrom straddle a tension rod 29. The spacing between the stop pins 38—38 is made slightly greater than the diameter of the tension rod 29 so that contact between these parts is normally very light or non-existent.

With the sheaves 1, 2, 3 and 4 engaged with cable runs reeved in accordance with customary practice the parts of the load block of this invention tend toward vertical alignment, e. g., the positions shown in Figs. 1 and 2 under the influence of gravity. With a load secured to the hook 35 some slight misalignment may be expected since the slings joining the load to the hook 35 may not be received in the hook in a position exactly aligned with its axis. The degree of misalignment thus induced, however, is slight.

If the load received upon the hook 35 is substantial and it has been lifted or lowered, accumulated friction in the runs of the cable passing under the sheaves 1, 2, 3 and 4 and the winch and upper block parts associated therewith will cause axle 5 to be canted or displaced from a horizontal position. Alignment of the face 26 of the anvil 25 with the thrust face 34 of the strain gauge 32 may be preserved nevertheless due to the rotational freedom provided by the trunnion bearings 19 and 20 and by the rotational freedom in the bearings within the sheaves 1, 2, 3 and 4. This alignment is self-seeking.

If a force tending to displace the anvil face 26 from exact alignment with the axis of collar 33 occurs, due to loading or otherwise, the effective force will nevertheless remain essentially vertical. For this reason, strain gauge 32 is subjected to loading substantially free of eccentric and torsional stress and a true indication of weight can be obtained therefrom in spite of canting of axle 5.

While any suitable apparatus may be employed as the sensitive element 32, and such forms no part of this invention, it is preferred that the element 32 be an electrical resistance strain gauge of the type in which a fine electrical conductor is adherently attached to but electrically insulated from the surface of a standardized deformable body with the fine electrical conductor oriented to be deformed in keeping with load imposed deformations of the standardized body so that the electrical resistance thereof will be subject to variation as a function of load. Such strain gauges are described in United States Letters Patent No. 2,292,549, granted August 11, 1942, and the details thereof are therefore not included herein.

Where an electrical resistance strain gauge is employed an electrical connection with the fine electrical conductor may be established through a flexible electrical conducting lead or cable 42 as shown. The cable 42 is extended to indicating instruments not shown within the crane operator's cab which by measurement of the resistance of the fine electrical conductor will show the weight of the load attached to the hook 35. If strain gauges of other forms are employed, such for example as a mechanical extensometer, the dial thereof may be contained within or attached to the housing 32 and optical means may be provided permitting the user of the device to ascertain the weight indicated when the hook 35 is in elevated location. Other means for communicating the load indication may be provided if desired.

Figure 5:
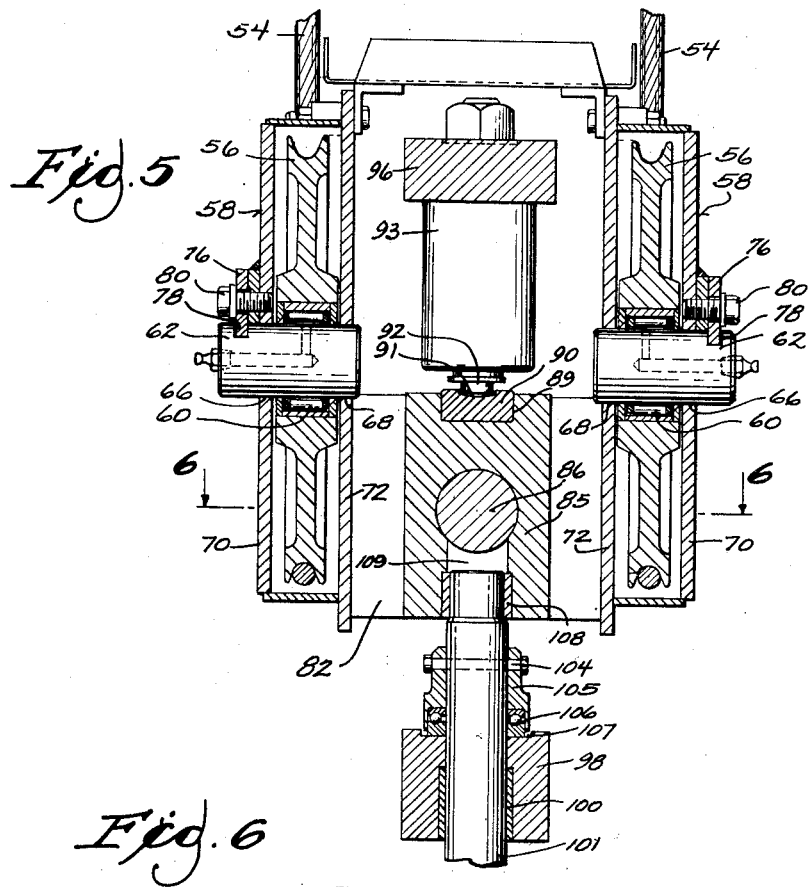
Fig. 5 is a cross sectional view taken along the line 5—5 of Fig. 4.
Figure 6:
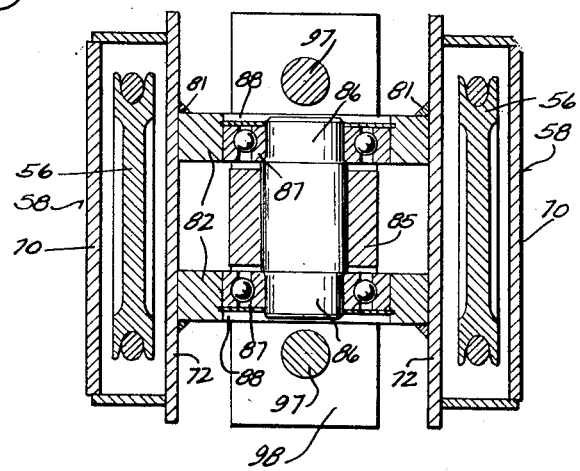
Fig. 6 is a cross sectional view taken along the line 6—6 of Fig. 5.

The embodiment of the invention shown in Figs. 4 through 6 is generally similar to the embodiment disclosed in Figs. 1 through 3 although several features of improvement are incorporated therein. Hoist cables 54 are reeved about axially spaced sheaves 56. The sheaves are disposed in shells or frames 58 and are rotatable on bearings or cloaks 60, on axle stub pintles 62. The axle pintles 62 are fixed in aligned openings 66 and 68, formed respectively in outside plates or cheeks 70, and inside plates or cheeks 72, which comprise side walls of the respective housings 58. The pintles 62 are axially held in place by removable plates 76 which engage peripheral grooves 78 in the respective pintles 62. The plates 76 are mounted to the side plates 70 by means of the bolts 80.

The inside plates 72 of the respective sheave frames 58 are cross connected by laterally spaced beams 82 which are welded to the plates at 81 and are disposed generally below the level of the common axis of rotation of sheaves 56. Between beams 82 I mount a load bearing member or anvil 85 having trunnions 86 rotatably supported by bearings 87 seated in bearing sockets 88 provided in the beams 82. The common axis of oscillation of trunnions 86 is transverse to the axis of rotation of the respective sheaves 56 so that the load bearing apparatus suspended from the anvil 85 will be self-leveling as in the previously described embodiment.

Anvil 85 is provided on its uppermost surface with a wear insert 90 seated in anvil socket 89. The wear insert 90 has a spherical faced socket 91 to receive the spherically faced end of the bearing button 92 of strain gauge cell 93. The strain gauge cell may be substantially identical to the one previously disclosed and supports on its upper end the cross beam 96 of a yoke hanger having suspension rods 97 which adjustably support the lower cross beam 98.

Cross beam 98 is provided with a vertical bore 99 in which sleeve bearing 100 is seated. The shank 101 of hook 102 extends through bearing 100 and bore 99 and is pinned at 104 to thrust collar 105 which is rotatably seated on thrust bearing 106. Thrust bearing 106 rests in socket 107 formed in the upper face of cross beam 98.

The extreme upper end of hook shank 101 is received in sleeve bearing 108 mounted in bore 109 formed in the lower portion of the anvil 85. Accordingly, the hook may freely rotate on its shank 101 and the shank is laterally braced at axially spaced points in its bearing 100 in the cross beam 98 and its bearing 108 in the anvil 85. The engagement of hook shank 101 with both the yoke beam 98 and anvil 85 keeps the hook pull transversely aligned with the axis of trunnions 86.

In the structure just described, the axis upon which the trunnions 86 oscillate is spaced materially below the axis upon which the sheaves 56 rotate. Accordingly, the offset of trunnion axis 86 below the sheave axles 62 provides a moment arm about which the hook load will exert force to maintain the block sheave axis level. Any tendency for the sheave axis to tilt to raise one sheave above the other, because of cable friction, etc., will be immediately counteracted by the component of force exerted on the moment arm aforesaid tending to levelize the block. This leveling action will maintain the cables 54 in substantially perfect alignment with the grooves on the sheaves 56 and will equalize the tension in the cables.

In addition to the cross bracing between the respective sheave frames 58 provided by the cross beams 82, I may also cross brace the frames by means of the channel members 110, best shown in Fig. 4. One of the cross channels 110 may be provided with a guide eye 111 through which the wiring 112 to the electrical resistance element on strain gauge cell 93 is threaded.

Figure 7:
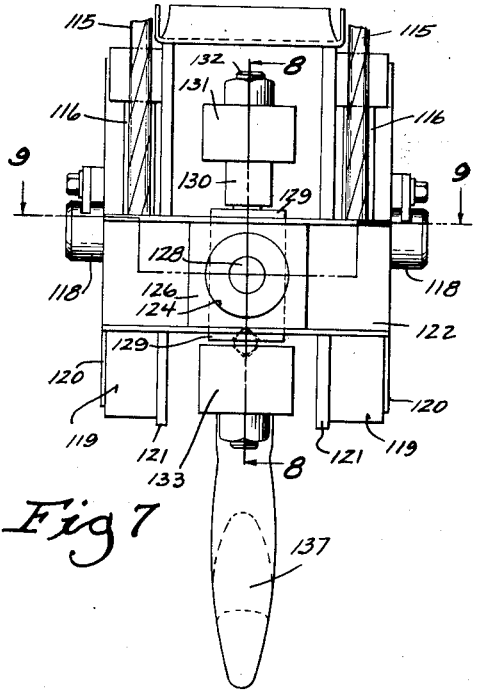
Fig. 7 is an elevation of a still further modified embodiment of the invention in which I use multiple strain gauge cells and anvils.
Figure 8:
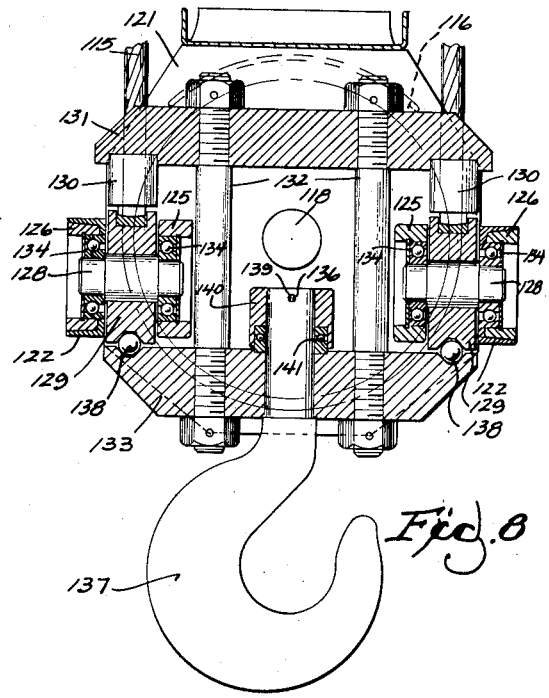
Fig. 8 is a cross sectional view taken along the line 8—8 of Fig. 7.
Figure 9:
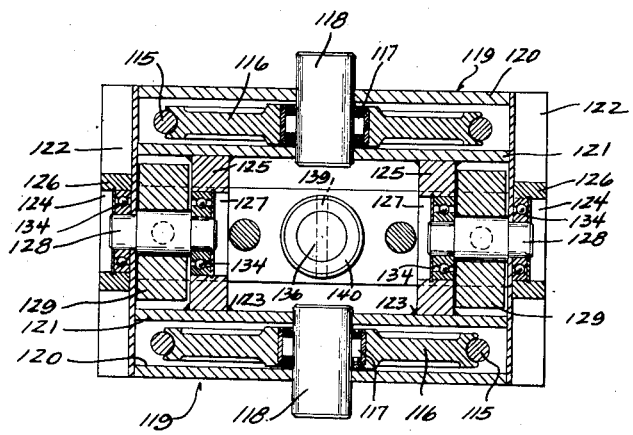
Fig. 9 is a cross sectional view taken along the line 9—9 of Fig. 7.

The embodiment of the invention shown in Figs. 7 through 9 incorporates the desirable block self-leveling and cable tension equalizing features of the device shown in Figs. 4 through 6. The device of Figs. 7 through 9, moreover, further conserves headroom in the sheave block by dividing the hook load between multiple anvils and associated strain gauge cells. Accordingly, each anvil and associated strain gauge cell may be made smaller and more compact than the corresponding elements of the previously described embodiments and thus permit reduction in the overall height of the block.

In the device of the embodiment shown in Figs. 7 through 9, the cables 115 are reeved about axially spaced sheaves 116 having bearings 117 journaled on the stub axle shafts or pintles 118 which are fixedly mounted in the sheave frames 119 as in the previously described embodiment. Across the ends of the outer and inner plates 120, 121 of the respective frames, I provide cross connecting channel beams 122. I also provide cross beams 125 laterally spaced from channels 122 which span the space between the innerplates 121 of the respective sheave frames and are welded thereto at 123.

The cross channels 122 are provided with bearing block inserts 126 having annular sockets 124 laterally aligned with annular sockets 127 provided in the cross beams 125. The respective sockets of the bearing blocks 126 and cross beams 125 seat ball bearings 134 on which the trunnions 128 of anvils 129 are rotatably mounted on axes transverse to the shafts 118 on which the cable sheaves 116 are rotatable. As clearly shown in Figs. 7 and 8 the aligned axes of trunnions 128 are downwardly offset from the axis of cable sheave axle shafts 118.

The respective anvils 129 are provided with bearing sockets for the dual strain gauge cells 130. The strain gauge cells 130 are cross connected by the top beam 131 of a hook suspending yoke having adjustable tension rods 132 and a lower beam 133 which rotatably supports the shank 136 of hook 137. I desirably provide ball detents 138 interengaged between the upper face of lower cross beam 133 and the lower faces of anvil 129 to key the upper and lower beams of the yoke in vertical alignment with trunnions 128 and stabilize the yoke structure in a vertical plane.

The shank 136 of hook 137 is suspended by cross pin 139 from bearing block 140 which rests on thrust bearing 141 rotatably mounted in a suitable socket formed in the upper face of beam 133. Accordingly, the hook 137 may freely rotate and the hook load will keep the block level because of the moment arm aforesaid.

The electrical resistance elements attached to the strain gauge cells 130 are electrically connected in series to provide an accurate weight reading at the recording device (not shown).

I claim:

1. In a weighing hook for cranes for indicating the load sustained by said hook the combination comprising a pivot member having a substantially horizontal pivot axis adapted to be engaged and sustained by a hoisting line, horizontal trunnions having a common axis transversely disposed and centrally located with reference to said pivot member and supported thereby, an adjustable intermediate member carried on said trunnions freely adjustable within a limited range about the axis thereof and the said pivot axis, a hook, and an electrical resistance strain indicating element forming a load sustaining connection between said hook and said intermediate member.

2. In a weighing bottom block for cranes for indicating the load sustained thereby, the combination comprising a sheave axle having a substantially horizontal axis, sheaves symmetrically disposed and rotatably mounted on the ends of said axle adapted to be engaged and sustained by multiple reeving, a pair of substantially horizontal trunnions transversely disposed and centrally located with reference to said axle and supported thereby, a substantially horizontally disposed anvil carried on said trunnions pivotally adjustable within a limited range about said axle axis and said trunnion axis, a yoke extending from a strain element engaging portion above said anvil to a hook support portion beneath said anvil, a hook secured to said hook support portion, and a compressible strain indicating element secured to said yoke and interposed between the latter and said anvil.

3. In a weighing bottom block for cranes for indicating the load sustained thereby, the combination comprising a non-rotatable sheave axle having a substantially horizontal axis, sheaves symmetrically disposed and rotatably mounted on the ends of said axle adapted to be engaged and sustained by multiple reeving, horizontal trunnions mounted on said axle having a common axis transversely disposed and centrally located with reference to said axle, an intermediate member including a substantially horizontally disposed upwardly facing anvil face carried on said trunnions freely adjustable within a limited range about said axle axis and said trunnion axis to permit assumption of a horizontal attitude, a yoke having an upper part extending across and spaced above said anvil, a tension portion extending downwardly therefrom and a lower portion beneath the sheave axle providing a hook support, a compressible strain indicating element secured to the upper part of said yoke and interposed between the latter and said anvil face having a downwardly facing sensing face in contact with said anvil face in load sustaining contact therewith, and a load hook dependent from and secured to the hook supporting part of said yoke in substantially vertical alignment with the sensing face of said strain indicating element.

4. A weighing bottom block in accordance with claim 3 wherein the compressible strain indicating element comprises an electrical resistance strain gauge.

5. A weighing bottom block in accordance with claim 3 wherein the sensing face of the strain indicating element is spherical.

6. A weighing bottom block in accordance with claim 3 wherein stop means engaging the intermediate member limit its freedom of movement with respect to the yoke.

7. A weighing bottom block comprising axially spaced cable sheaves, axle means therefor, a load sustaining member intermediate said spaced cable sheaves and load sustaining member trunnions pivotally connected to said axle means for oscillation of said member on an axis transverse to the axis of cable sheave rotation whereby said member is self-leveling, a strain gauge cell in load bearing engagement with said member and means including a hook for imposing a load on said strain gauge cell for support by said cable sheaves.

8. The device of claim 7 in which the axle means comprises a drop center frame on which the trunnion axis is offset below the level of the sheave axis to provide a moment arm about which the hook load will exert a force tending to keep the sheave axis level.

9. The device of claim 8 in which said drop center frame comprises multiple cross connecting beams spanning the space between said sheaves, multiple load sustaining members having trunnions pivotally supported on said beams and multiple strain gauge cells in load bearing engagement with said members, and means common to said multiple cells for transmitting load from said hook to each of said cells whereby the load is divided between said cells.

10. A weighing bottom block comprising axially spaced cable, sheaves, sheave frames provided with pintles on which said sheaves are rotatable, a beam cross connecting said sheave frames, a self-leveling load bearing member intermediate said frames including means mounting said member on said cross beam, a strain gauge cell in load bearing engagement with said member and means including a hook for imposing a load on said strain gauge cell and member for support of said load by said cable sheaves.

11. The device of claim 10 in which said means comprises a yoke having an upper cross beam in load bearing engagement with the strain gauge cell, a lower cross beam to which the hook is connected, tension means cross connecting said upper and lower beams, trunnions on which said self-leveling load bearing member is oscillatory and means interconnecting said lower beam to said load bearing member with said upper and lower beams substantially aligned in a plane including the axis of oscillation of the load bearing member trunnions.

12. The device of claim 11 in which said interconnecting means comprises an upward extension of the hook shaft.

13. The device of claim 11 in which said interconnecting means comprises a ball detent respectively socketed in said load bearing member and lower cross beam.

14. A weighing bottom block comprising axially spaced cable sheaves, sheave frames provided with pintles on which said sheaves are rotatable, a beam cross connecting said sheave frames, a self-leveling load bearing member intermediate said frames including oscillatory means for mounting said member on said cross beam, a strain gauge cell in load bearing engagement with said member and means including a hook for imposing a load on said strain gauge and member for support of said load by said cable sheaves, said beam being disposed at a level lower than the axis of sheave rotation and said oscillatory means being disposed on an axis of oscillation offset below the axis of sheave rotation, the offset between said axes comprising a moment arm about which hook load will exert a force tending to maintain the axis of sheave rotation level.

15. The device of claim 14 in which said block is provided with multiple cross beams interconnecting said sheave frames and multiple load sustaining members having trunnions pivotally mounted on said beams, and multiple strain gauge cells in load bearing engagement with said members whereby to divide the load between the respective strain gauge cells and members.

References Cited in the file of this patent

UNITED STATES PATENTS

| Number | Name | Date |
|---|---|---|
| 1,111,560 | Brown | Sept. 22, 1914 |
| 1,214,745 | Beard | Feb. 6, 1917 |
| 1,424,888 | Eason | Aug. 8, 1922 |
| 1,934,201 | Miller | Nov. 7, 1933 |
| 2,061,863 | Wells | Nov. 24, 1936 |
| 2,298,216 | Lamberger | Oct. 6, 1942 |
| 2,304,402 | Faulkner | Dec. 8, 1942 |
| 2,645,120 | Scott | July 14, 1953 |